A. W. HAMPSHIRE.
SUPPORT FOR TROLLEY WHEELS.
APPLICATION FILED APR. 29, 1914.
1,125,518.
Patented Jan. 19, 1915.
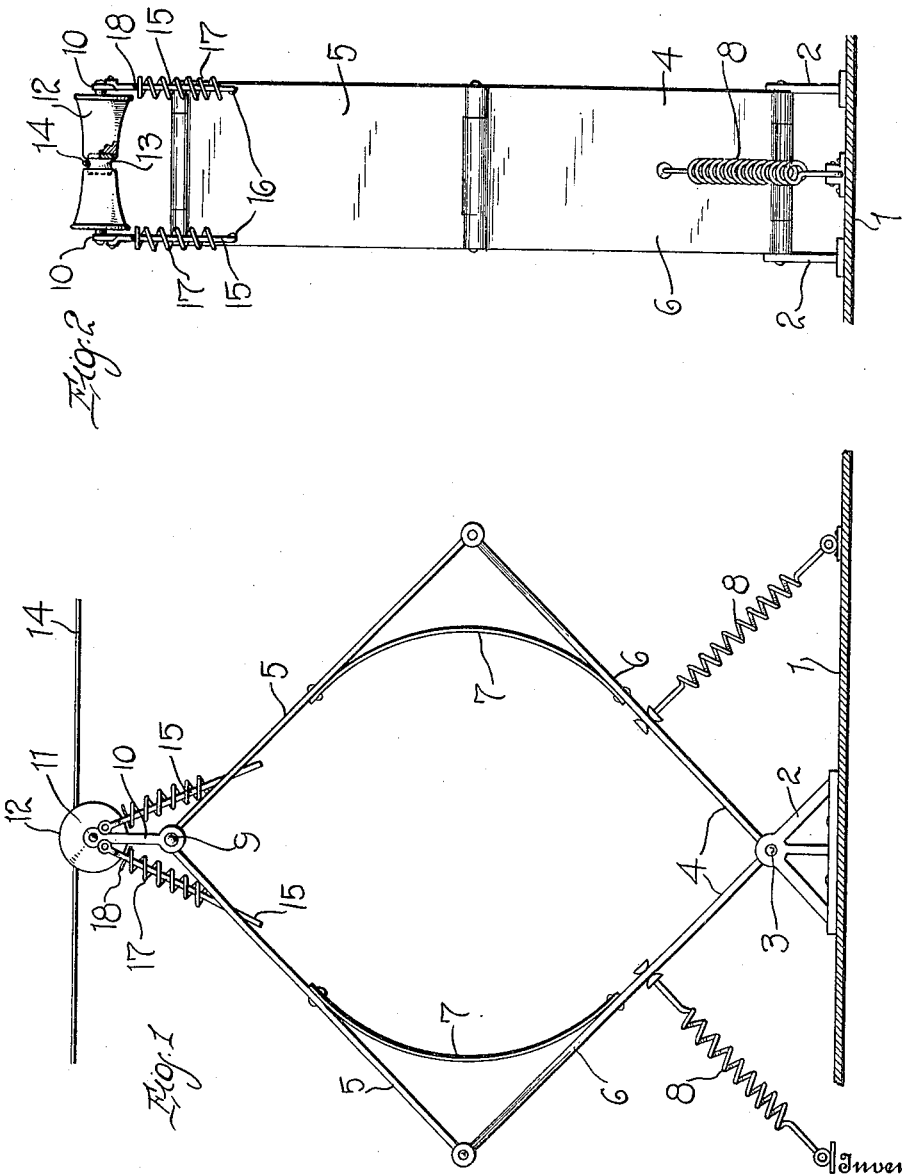
A. W. HAMPSHIRE ved device; and Fig. 2 is an elevational view, looking at one edge thereof.

UNITED STATES PATENT OFFICE.

ARTHUR W. HAMPSHIRE, OF HADDON HEIGHTS, NEW JERSEY.

SUPPORT FOR TROLLEY-WHEELS.

1,125,518.  Specification of Letters Patent.  Patented Jan. 19, 1915.

Application filed April 29, 1914. Serial No. 835,218.

*To all whom it may concern:*

Be it known that I, ARTHUR W. HAMPSHIRE, a citizen of the United States, residing at Haddon Heights, in the county of Camden and State of New Jersey, have invented certain new and useful Improvements in Supports for Trolley-Wheels, of which the following is a specification, reference being had to the accompanying drawings.

This invention relates to supports for trolley wheels, and an object thereof is the provision of a vertically yieldable support for engagement with an over-head conductor or trolley wire, whereby the inequalities in the wire will be compensated for by the yieldable support so that the trolley wheel carried upon the support will always be maintained in contact with the trolley wire.

A further object of this invention is the provision of a vertically yieldable support for trolley wheels, the support comprising a pair of toggle members which carry the trolley wheels at their upper pivotally connected ends, the lower ends of the toggle members being pivotally connected to the top of the car, the toggle members having expansion springs interposed between their upper and lower sections to normally force the trolley wheel upwardly, the support also including equalizing springs which are connected at one end to the lower ends of the toggle members and at their opposite ends to the top of the car.

A still further object of this invention is the provision of an extensible support for trolley wheels, the trolley wheels being adapted for engagement with the trolley wire when the car is moving in either direction, the support being also capable of yielding in the direction of travel of the car so that the support will be relieved of great strain when the trolley wheel is forced downwardly owing to the trolley wire being disposed closely adjacent to the top of the car when the same passes under a bridge or the like.

With these and other objects in view, my invention consists in the novel construction, combination, and arrangement of parts to be hereinafter more fully described, claimed, and illustrated in the accompanying drawing, in which, Figure 1 is a side elevation of my improved device; and Fig. 2 is an elevational view, looking at one edge thereof.

Referring more particularly to the drawing, the numeral 1 designates the top of an electric car, to the central portion of which, adjacent its side edges, is secured a pair of upstanding brackets 2 between which a shaft 3 is rotatably mounted. Connected to the shaft 3, at their lower ends, is a pair of toggle members 4, each of the members comprising an upper plate 5 and a lower plate 6 which are pivotally connected together, the upper plates being pivotally connected together at their upper ends, and the lower plates being pivotally connected to the rod 3. A bowed leaf spring 7 is connected at its opposite ends to the upper and lower plates of each toggle member, so that the members are normally forced upwardly, the upward movement of the toggle members being limited by the equalizing springs 8, each of the springs being connected at one end to the lower plate 6 of one of the toggle members and at its lower end to the top of the car. The upper ends of the plates 5 are pivotally connected to a rod 9, and pivotally connected to the opposite ends of the rod is a pair of upstanding arms 10, in the upper ends of which a shaft 11 is mounted, the trolley wheel 12 being rotatably mounted on the shaft 11. The trolley wheel 12 is provided in its periphery intermediate of its ends, with an annular groove 13 to receive the feed wire 14, and the wheel is tapered inwardly from its opposite ends to the groove 13, so that should the wire 14 come out of engagement with the groove 13, the tapered ends of the wheel will immediately feed the wire back to its groove. To brace the wheel in its vertical position, pairs of downwardly extending diverging arms 15 are connected to the upper ends of the arms 10, the lower ends of the arms 15 extending downwardly through openings 16 formed in the upper plates 5 near their upper ends and adjacent their opposite side edges, helical springs 17 being disposed around the arms 15 for engagement against the upper plates 5 and the pins 18 in the arms 15 to normally hold the wheel 12 in its vertical position.

In the practical use of my device, when the car is moving over the ground, the feed or trolley wire 14 is engaged in the groove 13 of the trolley wheel 12, the springs 7 being depressed owing to the engagement of the wheel with the wire, and when the wire is disposed at a relatively greater distance from the top of the car owing to a hollow in the roadway, the springs 7 will force the toggle members upwardly whereby to hold the trolley wheel in engagement with the wire. Should the trolley wires be depressed closely adjacent the top of the car as when the same moves under a low bridge or the like, the support will be easily forced downwardly against the tension of the springs 7 so that the trolley wheel is prevented from striking the bridge and becoming broken. It will readily be seen that the support is allowed to yield in the direction of travel of the car, owing to the springs 8, so that when the car passes under a bridge and the wheel is quickly forced downwardly, the strain which would ordinarily be imposed upon the support is relieved by the allowance of the longitudinal movement of the support with relation to the car.

The preferred form of trolley wheel which is used in connection with my improved support is clearly illustrated in Fig. 2 of the drawing, and includes a central member 13 which is mounted on the shaft 11, and the side members 12, the side members being tapered from their outer ends inwardly, and being provided at their inner ends with longitudinally extending annular flanges for engagement over the outer ends of the central member 13. It will be seen that should the wire 14 become disengaged from the central member 13 of the trolley wheel, the springs 7 will immediately force the support upwardly to cause the wheel to again engage the wire, and should the wire strike one of the tapered side members 12 of the wheel, the wire will be quickly fed to the central member 13 by reason of the tapered construction of the side member 12.

Having thus fully described my invention, what I desire to claim and secure by Letters Patent, is:—

1. A support for trolley wheels comprising a pair of pivotally connected toggle members, each of the toggle members including upper and lower sections pivotally connected together, a trolley wheel carried by the upper ends of the upper sections of the members, and oppositely bowed leaf springs disposed between the sections of the members, the upper ends of the springs being secured against the inner faces of the upper sections, and the lower ends of the springs being secured against the lower faces of the lower sections, whereby the tension of said springs normally forces the trolley wheel upwardly.

2. A support for trolley wheels comprising a pair of pivotally connected toggle members, each of the toggle members comprising an upper and lower section, a shaft pivotally connecting the upper ends of the upper sections of the toggle members, upstanding arms loosely mounted upon the opposite ends of said shaft, a trolley wheel carried between the upper ends of said arms, springs interposed between the upper and lower sections of the toggle members to normally force the trolley wheel upwardly, downwardly diverging rods pivotally connected at their upper ends to said arms, the lower ends of said rods extending through said upper sections, pins disposed through said rods adjacent their upper ends, and springs arranged around said arms to bear against said upper sections and said pins to normally hold said arms in a vertical position.

In testimony whereof I hereunto affix my signature in the presence of two witnesses.

ARTHUR W. HAMPSHIRE.

Witnesses:
 C. L. HAMPSHIRE,
 JAMES R. HAMPSHIRE.

Copies of this patent may be obtained for five cents each, by addressing the "Commissioner of Patents, Washington, D. C."